(12) United States Patent
Kaleedhass

(10) Patent No.: US 7,391,890 B2
(45) Date of Patent: Jun. 24, 2008

(54) METHOD OF IDENTIFYING AN INDIVIDUAL USING BIOMETRICS

(75) Inventor: Karthik Kaleedhass, Selangor (MY)

(73) Assignee: Multimedia Glory SDN. BHD., Kuala Lumpur (MY)

( * ) Notice: Subject to any disclaimer, the term of this patent is extended or adjusted under 35 U.S.C. 154(b) by 559 days.

(21) Appl. No.: 10/902,786

(22) Filed: Aug. 2, 2004

(65) Prior Publication Data

US 2005/0058324 A1 Mar. 17, 2005

(30) Foreign Application Priority Data

Aug. 1, 2003 (MY) .............................. PI 2003 2932

(51) Int. Cl.
*G06K 9/00* (2006.01)

(52) U.S. Cl. ...................... 382/124; 382/115; 382/117; 382/133

(58) Field of Classification Search .................. 382/124, 382/115, 117, 133

See application file for complete search history.

(56) References Cited

U.S. PATENT DOCUMENTS 7,269,277 B2 * 9/2007 Davida et al. ............... 382/117

* cited by examiner

*Primary Examiner*—Matthew C. Bella
*Assistant Examiner*—Mike Rahmjoo
(74) *Attorney, Agent, or Firm*—Birch, Stewart, Kolasch & Birch, LLP

(57) ABSTRACT

A method of identifying an individual using biometric data is disclosed comprises of a sequence of steps. First the biometric data of the individual is enrolled, said biometric data selected from one or more of the following: finger print, palm print, iris or any other biometric data. The anchor features and other identifiable significant features are identified. The anchor features consist of: center point in fingerprints or palm prints, optic discs in retina image or lens section in iris image. The other identifiable significant features include: ridge join points, ridge line endings for finger prints or palm prints or macula and vessel density in retina, and lens and iris portion in iris image. The relativity of each significant feature in relation to the other feature is computed. The relativity includes distance or direction or both. The relativity is combined to obtain a classification code. The classification code and the biometric data obtained are encrypted. Then the encrypted data is stored. Some of the above steps are repeated In the process of capturing the biometric data of a person to be identified. The classification code is matched against the earlier stored classification code. The biometrics data is verified against the earlier stored biometrics data of the same individual.

6 Claims, 20 Drawing Sheets

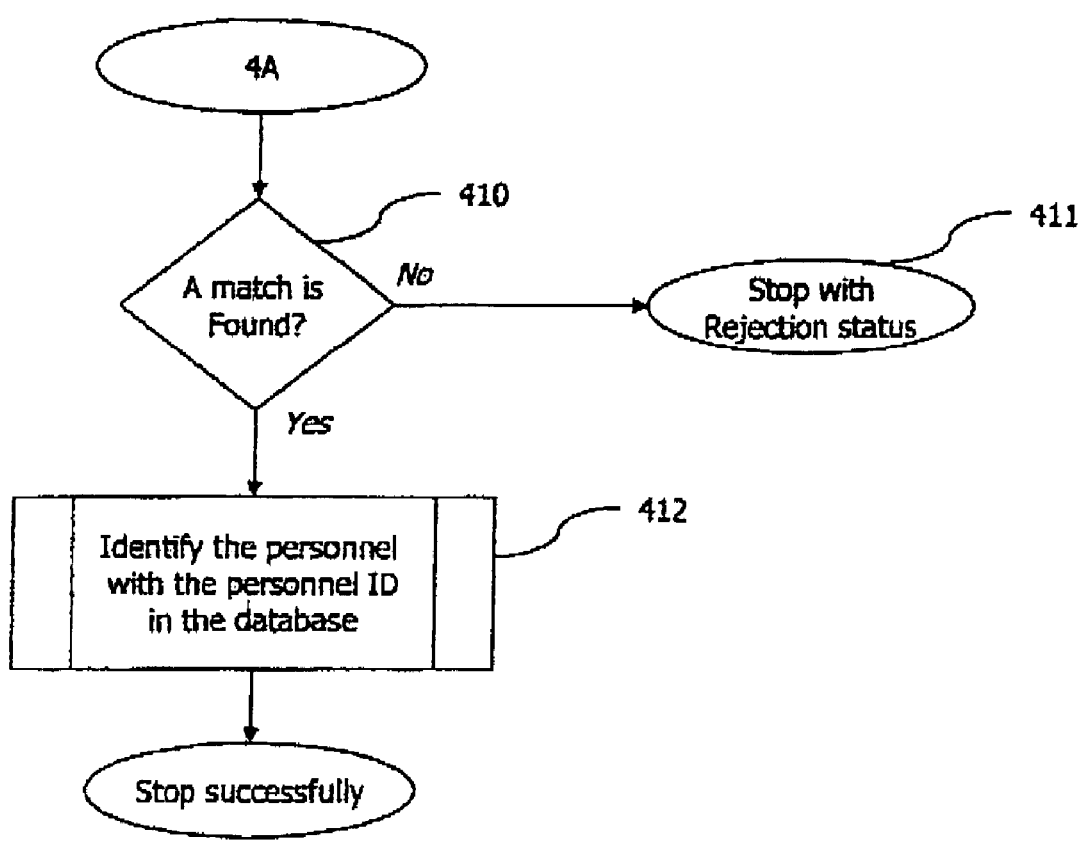
FIGURE 4 - continued

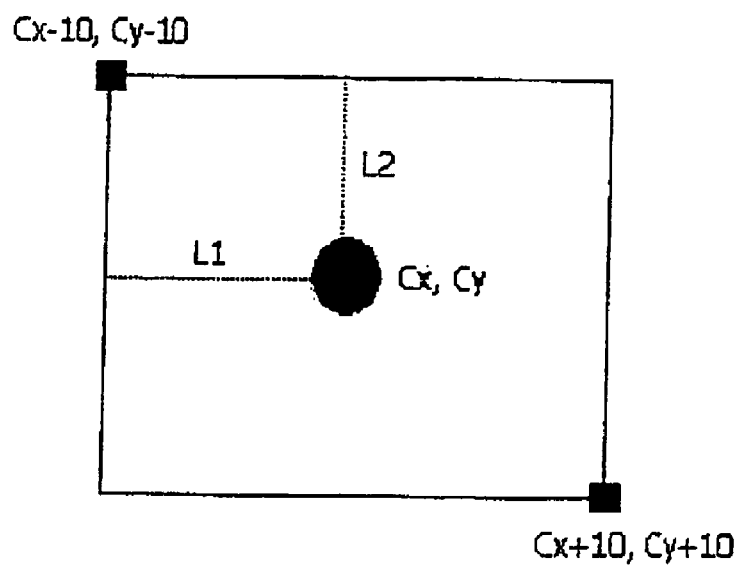
Cx, Cy     Pixel Position of Macula
L1     Half of Width of the Square, I.e. 10
L2     Half of Height of the Square, I.e. 10
Figure 10B-D

METHOD OF IDENTIFYING AN INDIVIDUAL USING BIOMETRICS

This Non-provisional application claims priority under 35 U.S.C. § 119(a) on Patent Application No(s). P1 2003 2932 filed in Malaysia on Aug. 1, 2003, the entire contents of which are hereby incorporated by reference.

The invention generally relates to a method of identifying an individual using his/her biometrics features. The biometrics features include but not limited to fingerprint, DNA, iris, retina, tissue and other features unique to an individual.

A person can be identified using his/her biometrics features. The biometrics features are generally unique to an individual and presence of two persons with similar biometrics features or a combination of biometrics features is rare and not unknown until today.

The process of identifying an individual includes a verification algorithm that verifies the known biometrics features with the presented or to be authenticated biometrics features referred to as "Live feature" in this description.

For identifying an individual, a list of known biometrics features, a prerequisite, will have to be maintained. The list of known biometrics features is also referred to as "the database".

There are prior art methods currently available for identifying an individual using biometrics features, referred to herein as "Method A" and are based on a commonly known sequential verification technique in which the live features are compared with all known biometrics features stored in the database as shown in FIG. 6. If a match is found during the comparison, the live features are identified based on the information that exists in the database. In Method A full comparison will be carried out with the Live features in a sequential manner.

There are also prior arts methods referred to as "Method B" in this document, currently available for identifying individual. These methods are similar to "Method A" but instead of full comparison, partial comparison is carried out so as to reduce time for comparison.

The two prior art and existent methods are explained in later paragraphs.

The information in the database that is used for identifying an individual is referred to as "Identification Information" in this description. The Identification Information is, but not limited to:
  Personnel Name
  Gender
  Nationality (If exists)
  Citizenship Identification Number (if any)
  Photograph The above individual information will have to be present in the database and should be related to the biometrics features using a unique identification number, referred to in this description as "ID Number" that is automatically generated or specified by the database maintainer. The automatic generation will be sequential numbers generated from the starting number specified by the database maintainer.

The relation between the Identification Information and the biometrics features will have to be created by identifying the two details a) Identification Information and b) Biometrics Features using the same ID Number. In such a relation, same ID Number say "1001" can be used to extract the Identification Information of an individual and his/her biometrics features from the database.

The ID Number that is used will have to be unique and all efforts will have to be carried out to make sure that they are not duplicated. This can be accomplished by alerting the users when they attempt to use existent ID Number during creation of Personnel Identification Information and by denying using the existent ID Number for new Personnel.

Method A performs well with small or limited number of features in the database; to identify an individual the current methods will take bearable amount of time (for example, one or two seconds). (See FIG. 6). The term quantity of "small", "limited" can be defined as the number of features that the current methods can verify within one or two seconds is referred to herein as "capable numbers" and it will normally be within the range of one hundred (100) to one thousand (1000).

It should be highlighted that the number of features in the database directly impacts the performance and the time in the current methods because in the current method the live features are compared in full with each and every feature in the database. As a result with smaller number of features in the database, the current method will complete faster than compared with larger number of features in the database.

The comparison includes the verification algorithm for verifying whether any two biometrics are similar and in this method this comparison (verification) is carried out in full, meaning all the required components of the verification are carried out without skipping. For example, in case of fingerprints, the verification components will include finding the similarity of the two feature points. This example is provided is to explain the meaning of comparison and other components of verification does exists and they are not explained in this description as they are prior art.

The "smaller number" can be defined as number of features with which the current method completes in the shortest acceptable time and the "larger number" can be defined as the number of features with which the current method competes in longer time period with its time taken is noticeable and unacceptable by the user.

There are prior art methods that currently exist that perform faster than the prior art method A but the result of the Method B is not accurate and is explained below. (See FIG. 7)

The performance impact in the Method A is mainly due to the processing time taken for each and every comparison of the features in the database. With larger number of features in the database the Method A takes longer time period to complete which is a limitation. To overcome this limitation, prior methods exists referred as "Method B" that will provide results much faster than Method A but with less accuracy.

In Method B, the time taken for comparison of each and every feature in the database is reduced, by using a partial comparison instead of full comparison. The partial comparison means that some of the verification components will be skipped based on the constant preset or based on the live features. The criteria used for slipping the components may be based on time taken for the component as they help in reducing the total time taken for identification.

During partial comparison, many of the verification components that decide the identification result may be skipped resulting in less accurate result.

The verification components that may be skipped in case of the fingerprint are, but not limited to:
  a) Enhancement, the step that enhances the biometrics raw source thereby increasing the quality of the source, fit for further processing.
  b) Elimination of False Feature Matches, the step that eliminates the incorrect similar feature matches between the live features and the features in the database.

The components listed above are some of the verification components present in the prior art method and there may be components not listed above that are skipped during the comparison.

When the skipping of the verification, the reliability and stability of the biometrics identification will be reduced resulting in, but not limited to
  a) Increase of False Acceptance Rate (FAR), the performance ratio measuring the rate at which the Method B identifies the individual incorrectly.
  b) Increase of False Rejection Rate (FRR), the performance ratio measuring the rate at which the Method B rejects the individual incorrectly.

The present prior art methods also does not include additional enhancement and verification steps resulting in increase of False Acceptance Rate (FAR) and False Rejection Rate (FRR).

The invention disclosed herein includes methods that do not skip the verification components. The sequential verification of the biometrics features is also eliminated in the method providing a stable, viable and reliable solution.

In the invention the biometrics features are classified based on the Global Characteristics. The classification is carried using the Classification Code generated for the biometrics features' Global Characteristics. The generation of the classification code is explained under FIG. 2, part of Detailed Description of Preferred Embodiments.

With the classification of the biometrics features using the classification code, in the invention, sequential comparison of all the biometrics features in the database is eliminated as explained under FIG. 4, part of Detailed Description of Preferred Embodiments. This is accomplished by classifying the features in the database using Classification Code.

In the invention the relation between the number of features in the database and the total time taken for identification is removed with the elimination of the sequential verification or comparing all the features in the database. As a result, the method in the invention will provide result much faster and in short time period than the current and prior art methods.

One of the important characteristic of the invention is none of the verification components are skipped during the identification, providing more accurate result in shortest time.

The invention also includes steps for reducing the False Acceptance Rate (FAR) and False Rejection Rate (FRR) as part of the verification step explained under FIG. 4 part of Detailed Description of Preferred Embodiments.

The summary of the steps in the invention as in FIG. 8 (refer to Detailed Description of Preferred Embodiments for details):

1. In this step, the live features are extracted from the biometrics acquisition devices. (Fingerprint scanners in case of Fingerprints, Iris scanners in case of Iris, retina scanners in case of Retina)
2. In this step, the Classification Code is generated from the Live features from step 1 as explained under FIG. 2, part of Detailed Description of Preferred Embodiments.
3. In this step, the generated Classification Code from step 2 is searched in the database of Classification Codes. The criterion for the search is the exact match of the Classification Code.
4. With the successful search of the classification code in the database, the features for the classification code is selected from the database and verified as explained under FIG. 5, part of Detailed Description of Preferred Embodiments.
5. Upon successful verification at step 4, the ID number allocated to the biometrics features from the database is used to retrieve the Identification information from the database. The Identification Information is also displayed as output for manual verification.

A method of identifying an individual using biometric data is disclosed comprises of a sequence of steps. First the biometric data of the individual is enrolled, said biometric data selected from one or more of the following: finger print, palm print, iris or any other biometric data. The anchor features and other identifiable significant features are identified. The anchor features consist of: center point in fingerprints or palm prints, optic discs in retina image or lens section in iris image. The other identifiable significant features include: ridge join points, ridge line endings for finger prints or palm prints or macula and vessel density in retina, and lens and iris portion in iris image. The relativity of each significant feature in relation to the other feature is computed. The relativity includes distance or direction or both. The relativity is combined to obtain a classification code. The classification code and the biometric data obtained are encrypted. Then the encrypted data is stored. Some of the above steps are repeated in the process of capturing the biometric data of a person to be identified. The classification code is matched against the earlier stored classification code. The biometrics data is verified against the earlier stored biometrics data of the same individual.

The last mentioned verification step could be omitted in certain circumstances. It is also possible to verify more than one type of biometric data such as fingerprint data and retinal image or retinal image and iris image and the like. Further, it is possible to incorporate the above-mentioned method with personal identification numbers. In situations where the biometric data is not very clear, it is possible to restrict the verification to the classification code alone.

DETAILED DESCRIPTION OF THE PREFERRED EMBODIMENTS

An illustration of the verification and identification using fingerprint will be described now.

The invention requires a biometrics raw data in the form of image obtained from the acquisition devices such as Fingerprint Scanner for Fingerprint, Iris scanners for IRIS and Retina Scanners for Retina biometrics.

The acquisition devices must provide high quality raw data such as high-resolution images for high performance of the verification and identification.

In this section, identification and verification of the fingerprint is detailed for illustrating the identification and verification based on the invention detailed in the Detailed Description of Preferred Embodiments section.

The methods for fingerprint in this section are also applicable for other biometrics types such as but not limited to Iris, Retina, and DNA.

This section, explains the Identification and Verification process with the live fingerprint. The process starts with the acquisition of the fingerprint image using the acquisition devices such as fingerprint scanners.

The fingerprint scanners with a minimum of 500 dpi (dots per inch) are used for obtaining the high quality fingerprint images. However scanners of lower resolution can be still used in the process.

Upon successful extraction of the fingerprint image from the acquisition device, the fingerprint features are extracted from the fingerprint image. The features include the following, but not limited to:

Core Point, also called as Anchor Point
Ridge Join points, auxiliary points in case of fingerprint
Ridge line endings auxiliary points in case of fingerprint
Other Core Points auxiliary points in case of fingerprint The extraction of above-listed features are explained below:

Anchor Point (Core Point)

Core point can be defined as the intersection point, or bifurcation point within the ridges that effect excessive change to the ridgeline flow. A list of core points are selected and the point, which effect the maximum change, is assumed as the anchor point.

Figure 9A:
FIG. 9A to 9F shows in sequence the identification of the core points and the auxiliary points of a fingerprint image.
Figure 9B:

For example, for the scanned image in FIG. 9A, the anchor points and the assumed anchor point is shown in the FIG. 9B.

In the FIG. 9B, the anchor points are indicate with black dots and assumed anchor point is indicated with the black rectangle.

It can be noted that the assumed anchor point indicated with the black rectangle affects the maximum of the ridgeline flow.

Ridge Join Points

Ridge Join point can be defined as the pixel location in which the ridges separate or join. The FIG. 9C has the Ridge Join points highlighted with black rectangles.

Ridge Line Endings

Ridge Line ending point can be defined as the pixel location that has the last pixel of a ridge. The FIG. 9D has the Ridge Line endings point indicated with black rectangles.

Other Core Point

Other core point can be defined as the anchor points selected apart from the assumed anchor point selected as "Anchor Point". The FIG. 9E has the Other Core point indicated in the black dots.

Figure 2:
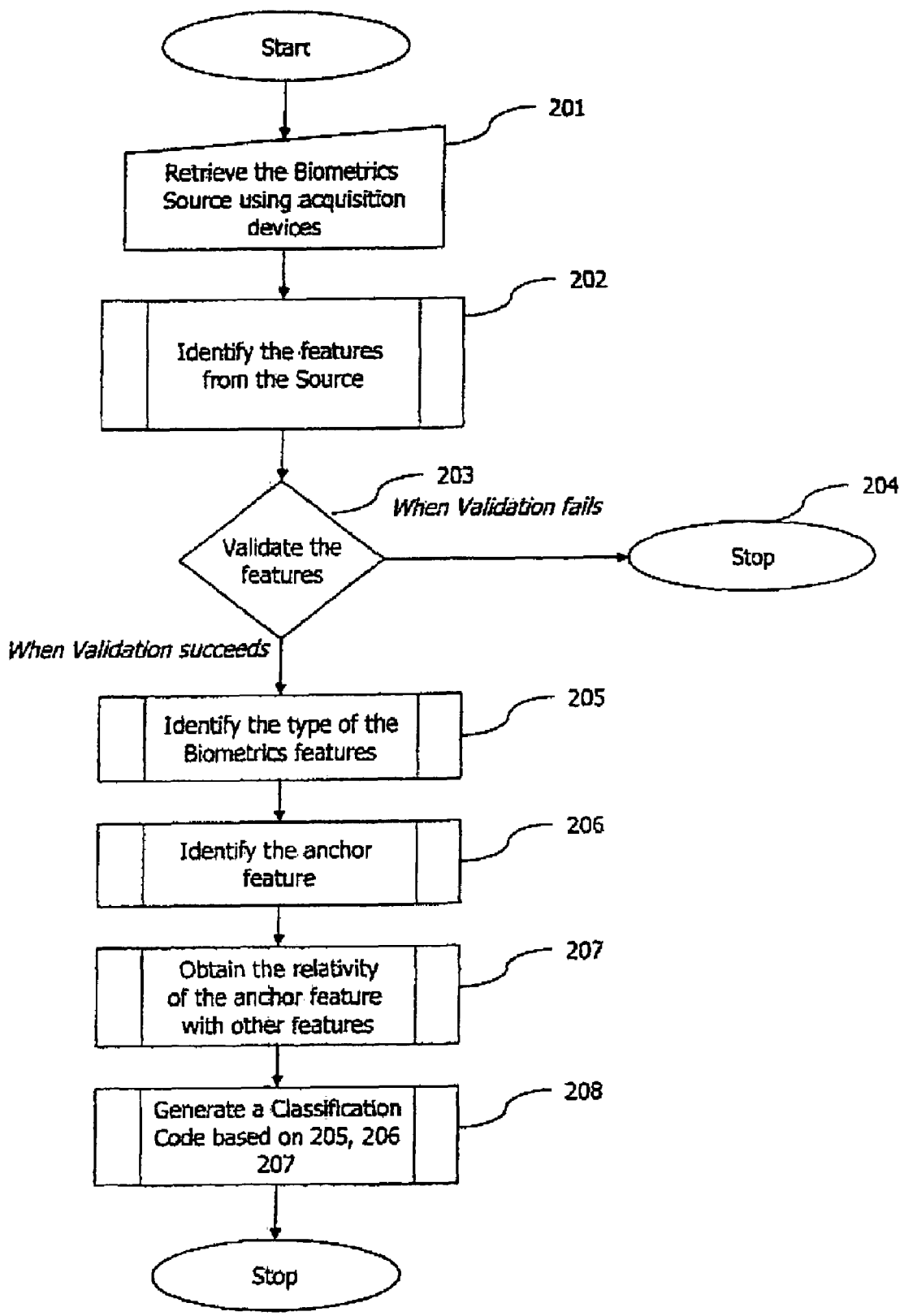
FIG. 2 is a flow diagram of the process of generating a classification code from the biometrics features.

Upon extraction of all features from the fingerprint image, the Classification Code is generated as specified under FIG. 2 of Detailed Description of Preferred Embodiments.

Figure 9C:
Figure 9D:
Figure 9E:
Figure 9F:

The generation of the classification code for the live fingerprint is explained as follows:

Relation of the Anchor Point and the Ridge Join Points:

In FIG. 9C and FIG. 9F, the relation between the anchor point and the Ridge Join points are established. The relation is established using the following properties:

Distance in pixels: Distance between anchor point and ridge join point
Angle: Angle between the anchor point and the ridge join point

EXAMPLES

| Feature | Distance | Angle |
|---------|----------|-------|
| 1 | 10 | 10 deg. |
| 2 | 15 | 20 deg. |
| 3 | 5 | 10 deg. |

The above values are sample values and based on the above values, the classification code is generated as:

| 1 | 10 | 10 | 2 | 15 | 20 | 3 | 5 | 10 |

In the above classification code, the components are:

| Value Number | Description |
|--------------|-------------|
| 1 | 1$^{st}$ Feature number |
| 2 | 1$^{st}$ Feature's distance |
| 3 | 1$^{st}$ Feature's angle |
| 4 | 2$^{nd}$ Feature number |
| 5 | 2$^{nd}$ Feature's distance |
| 6 | 2$^{nd}$ Feature's angle |
| 7 | 3$^{rd}$ Feature number |
| 8 | 3$^{rd}$ Feature's distance |
| 9 | 3$^{rd}$ Feature's angle |

The classification is also padded with zeros to get:

000100010000100002000150002000003000500010

Steps for generation of the classification remains the same for all other type of features such as Ridge Line endings and Other Core points Next an illustration of the verification and identification of retina will be described now. The process starts with the acquisition of the retinal image using the acquisition devices such as retinal scanners.

The fingerprint scanners with a minimum of 500 dpi (dots per inch) are used for obtaining the high quality retina images.

Upon successful extraction of the retinal image from the acquisition device, the retinal features are extracted from the retinal image. The features include the following, but not limited to:

Optic Disc (Anchor Point)
Macula
Vessel Density

The extraction of above-listed features are explained below:

Optic Disc

The visible portion of the optic nerve is called the optic disc and can be detected with the following criteria:

The optic disc has the maximum color difference when compared to all regions An area where the blood vessels originate—from the retinal image point of view The pixel location where the maximum color difference exists will have to be marked to get the Optic Disc.

Figure 10A:
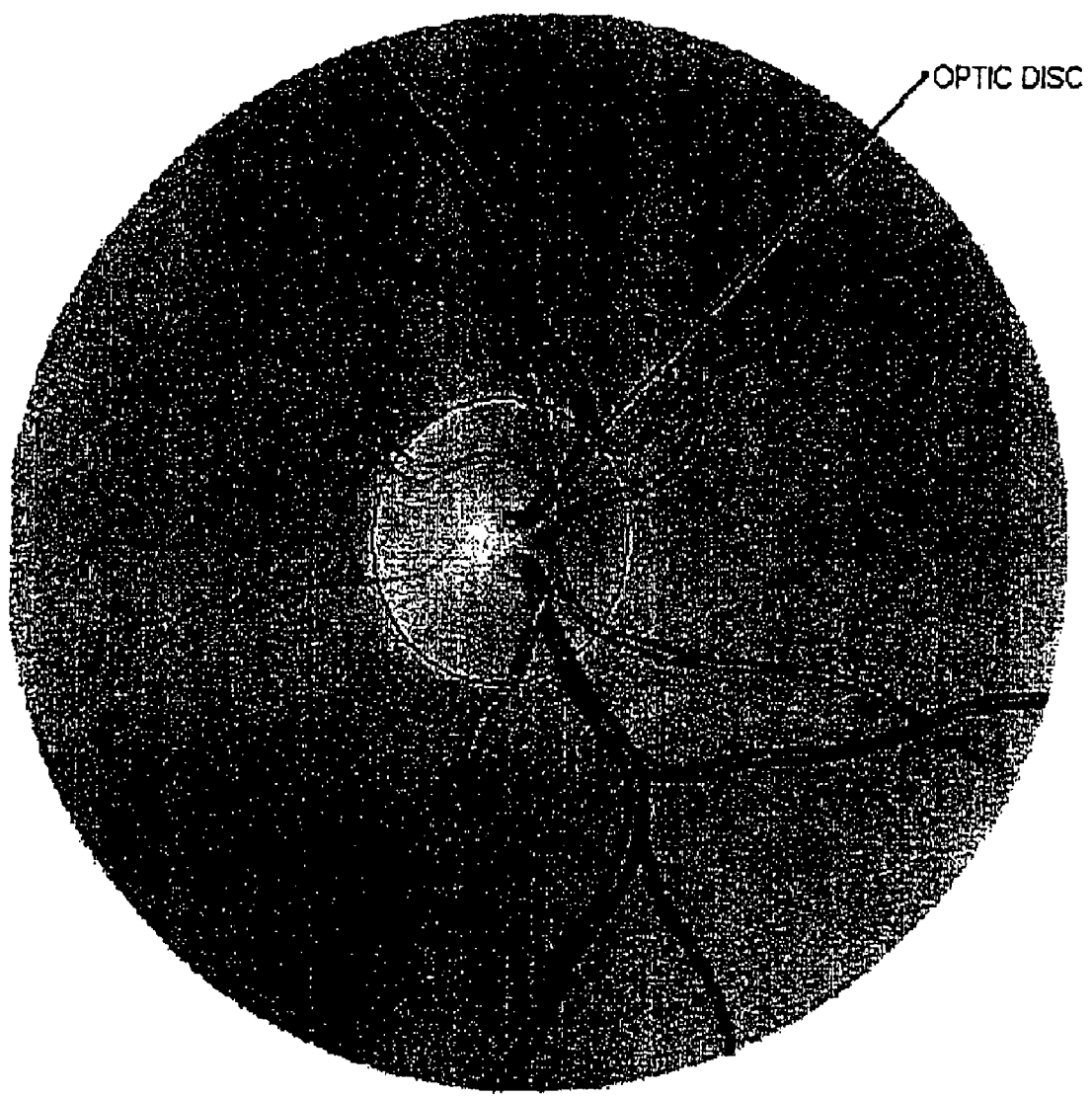
FIG. 10A to 10D shows in sequence the identification of the core points and the auxiliary points of iris image.

For example, for the obtained retinal image, the Optic Disc is identified in FIG. 10A. The pixel located of the maximum color difference is marked and a circle is obtained as a result.

Macula

The macula is the central point of the retina. The central point of the retina is obtained as the pixel position Cx, Cy where $Cx = ((\text{width of the Image})/2)+1$ $Cy = ((\text{height of the Image})/2)+1$ The width and height of the image is obtained from the biometrics acquisition device such as Retina Scanners.

Apart from the central point, the macula region is also obtained in the form of square. An imaginary square around the pixel position Cx, Cy is formed using the following co-ordinates:

Square Top Left Position=(Cx−10, Cy−10)
Square Bottom Right Position=(Cx+10, Cy+10)
Square width=20

All the co-ordinates above are pixel values within the retina image.

Figure 10B:
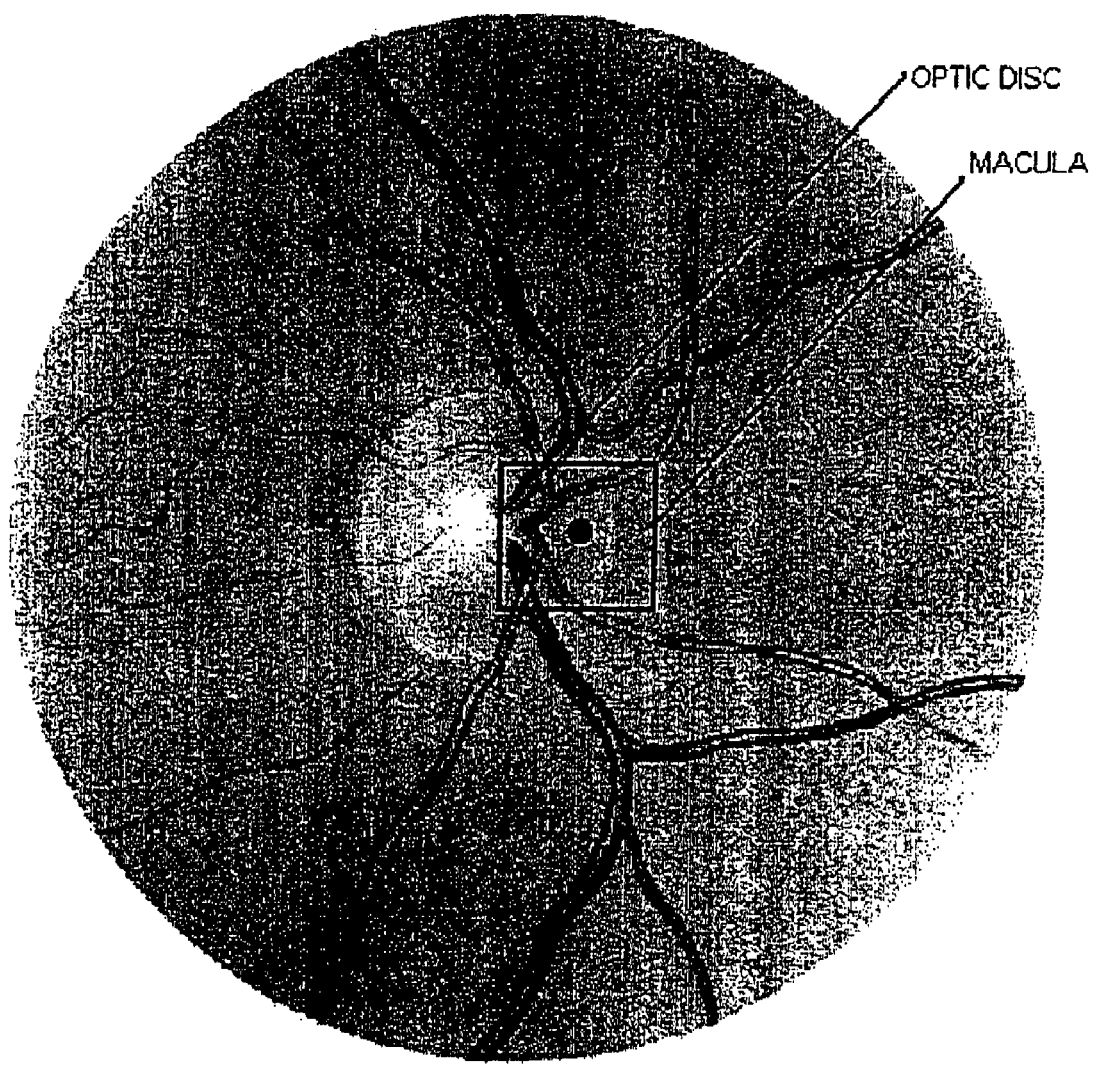

In the FIG. 10B, the macula is indicated using the circle and the macula region is indicated using a square.

Figure 10C:
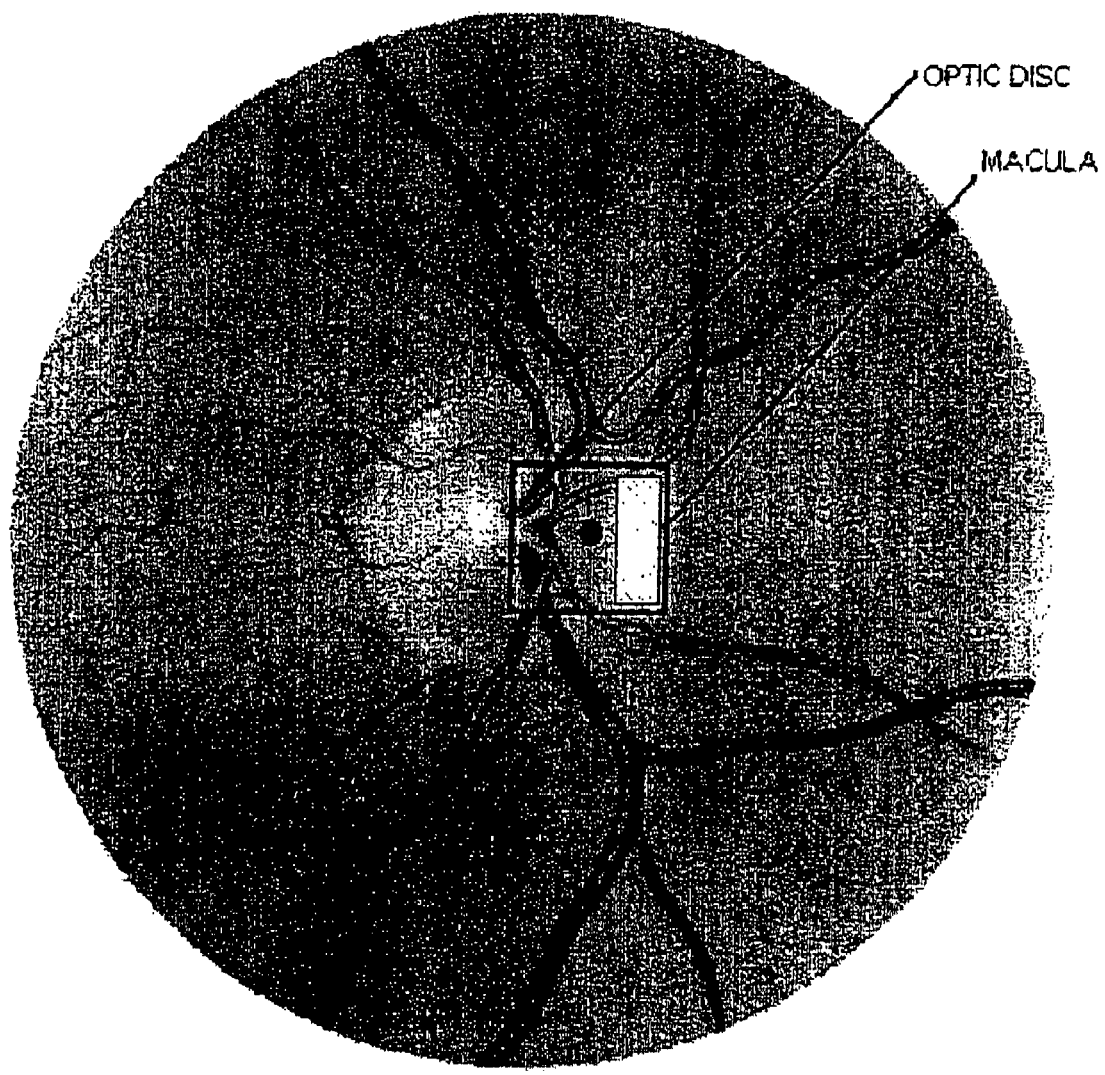
Figure 10D:
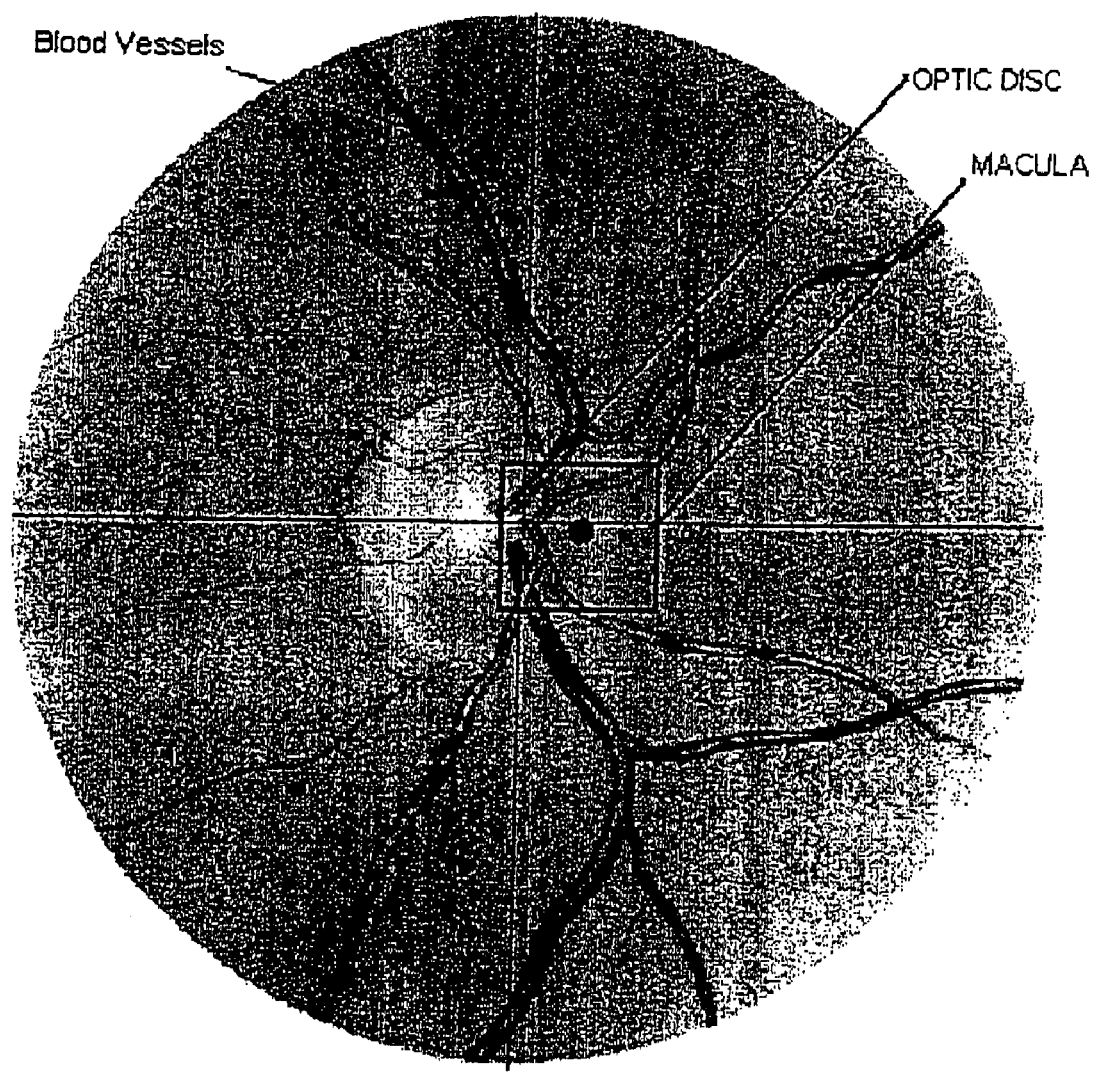

The FIG. 10B-D, shows the detailed representation of the macula point and the macula region within FIG. 10B.

The actual macula region is obtained by removing the overlapping region with the optical disc.

In FIG. 10C, the actual macula region is marked using diagonal pattern.

Vessel Density

To obtain the vessel density the retinal image, the retinal is divided into four regions. The division is based on the constant width derived from the full dimension of the retinal image.

For example, for the retinal image of 512×512 pixels, the four regions will have the dimension and the start positions as follows:

1. Region #1
   a. Size: 256×256
   b. Start: 0,0 (top-left x,y position in the full retinal image)
2. Region #2
   a. Size: 256×256
   b. Start; 257, 0
3. Region #3
   a. Size: 256×256
   b. Start: 0, 257
4. Region #4
   a. Size: 256×256
   b. Start; 257, 257

In the FIG. 10D, the retinal image divided into four regions is shown. The number of blood vessels pass through or originate or end in every region is obtained. The number of blood vessels in every region is the density of the blood vessels in the region.

The generation of the classification code for the live retinal image is explained as follows:

The classification of code for the retinal image contains the following information:

1. Location of the optic disc in the four regions
2. Location of the Macula in the four regions
3. Density of the Blood vessels in the four regions In this example, the classification code will be:

1. Location of the optic disc in the four regions: 03 (the region that has the maximum optic disc among the four regions)
2. Location of the Macula: 04
3. Density of the Blood vessels in the regions 01020104 (01 for Region #1,02 for Region #2, 01for Region #3, 04 for Region #4)

Classification Code: 030401020104

Figure 1:
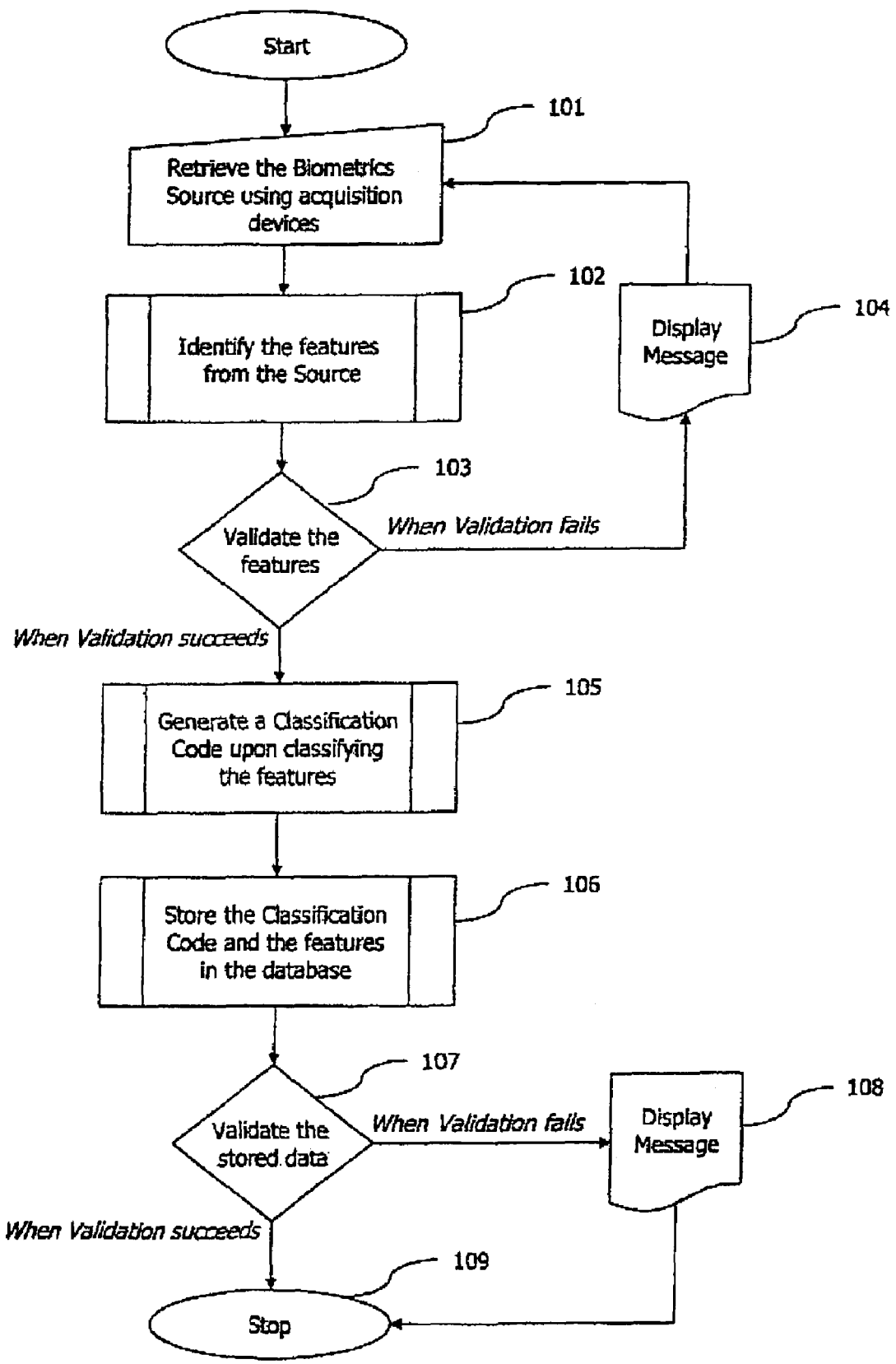
FIG. 1 is a flow diagram of the process of enrollment of biometrics features to be used for identification.

FIG. 1, is a flow diagram of the process of enrollment of biometrics features to be used for identification. The process of enrollment is an important step for identifying an individual as the step registers the biometrics features of the individual to the database.

An ID Number for every individual is created before this process and all necessary steps are to be taken to avoid duplication of the identifier. The biometrics features and the personnel records are referred with this identifier so as to establish a relation between the individual and the biometrics features. The identifier can be alpha, numeric or alphanumeric code.

The process starts with the retrieval of Biometrics Source also called as "raw data" in the step 101 i.e. Fingerprint Image in case of Fingerprint, Retinal Image in case of Retina and Iris Image in case of Iris and others. An acquisition device is used in this step for the retrieval of the Biometrics Source.

The quality of the raw data is also verified with the appropriate criterion for every type of Biometrics. The raw data obtained in this step is immediately rejected if the source is of low quality as known in prior art. The process continues with the step 102, if the quality of the raw data matches the criterions.

The criterion used in verification is obtained from the manual biometrics verification methods that are prior art.

The step 102 identifies the features from the data raw obtained at step 101. The features are taken from the raw data and due to the inevitable presence of noises, distortions and other irregularities do occur. The features are carefully extracted and filtering through the predefined criteria eliminates false features.

The criterion used in filtering is obtained from the manual biometrics verification methods that are prior art.

The features extracted in the step 102 are validated for the presence of required number of features for every biometrics type in the step 103. In the validation step 103, the presence of required features are checked and the process restarts from the step 101 when the validation fails. The user will be notified by displaying a message at step 104.

When the successful validation results, the process continues to the step 105, where a classification code is generated based on the extracted features at step 102. The process of to generation of classification code is explained in FIG. 2.

The process continues to the step 106, where the classification code generated at step 105 and the features extracted at step 102 are stored in the database along with the unique identifier for the individual. The detailed process of storing at step 106 is explained in the FIG. 3.

The stored information is also validated at the step 107 and when the validation fails process terminates with the failure state upon notifying the user at step 108.

The process completes with the success state (109) when the validation succeeds at step 107.

FIG. 2, is a flow diagram of the process of generating a classification code from the biometrics features.

The process of generating the classification code is a very important process that helps in reducing the total time taken for identification with large biometrics. The classification code contains global characteristics of a biometrics "raw data". In small database environments the classification code alone can be used for verification, as they are unique in most cases.

In large database environments the classification codes are used for filtering the biometrics features in the database for verification. This totally avoids sequentially verifying all the biometrics features in the database.

This process requires the Biometrics Source also called as "raw data" and an acquisition device is used for as retrieval (in the step 201). The features are extracted from the raw data in the step 201.

The extracted features are validated in the step 203 and if the validation falls the process will terminate with the failure state (step 204). When the validation succeeds, the process continues from the step 205.

In the step 205, the type of the biometrics feature is identified based on the placement of the features on the raw data. The types are also based on the direction of the placement of the features.

With the biometrics features type identified, the process continues from the step 206 where an anchor feature (described later) is identified among the biometrics features from the step 202. The anchor feature is identified based on its placement and its prominence with other features.

With the anchor feature from the step 206, the relative properties of the other features with the anchor feature are obtained at step 207. The properties include but not limited to distance and direction.

At last in the step 208 a classification identifier is generated based on the results from the steps 205, 206, 207 and the process terminates with success state. The generated identifier will be called as "classification code".

Figure 3:
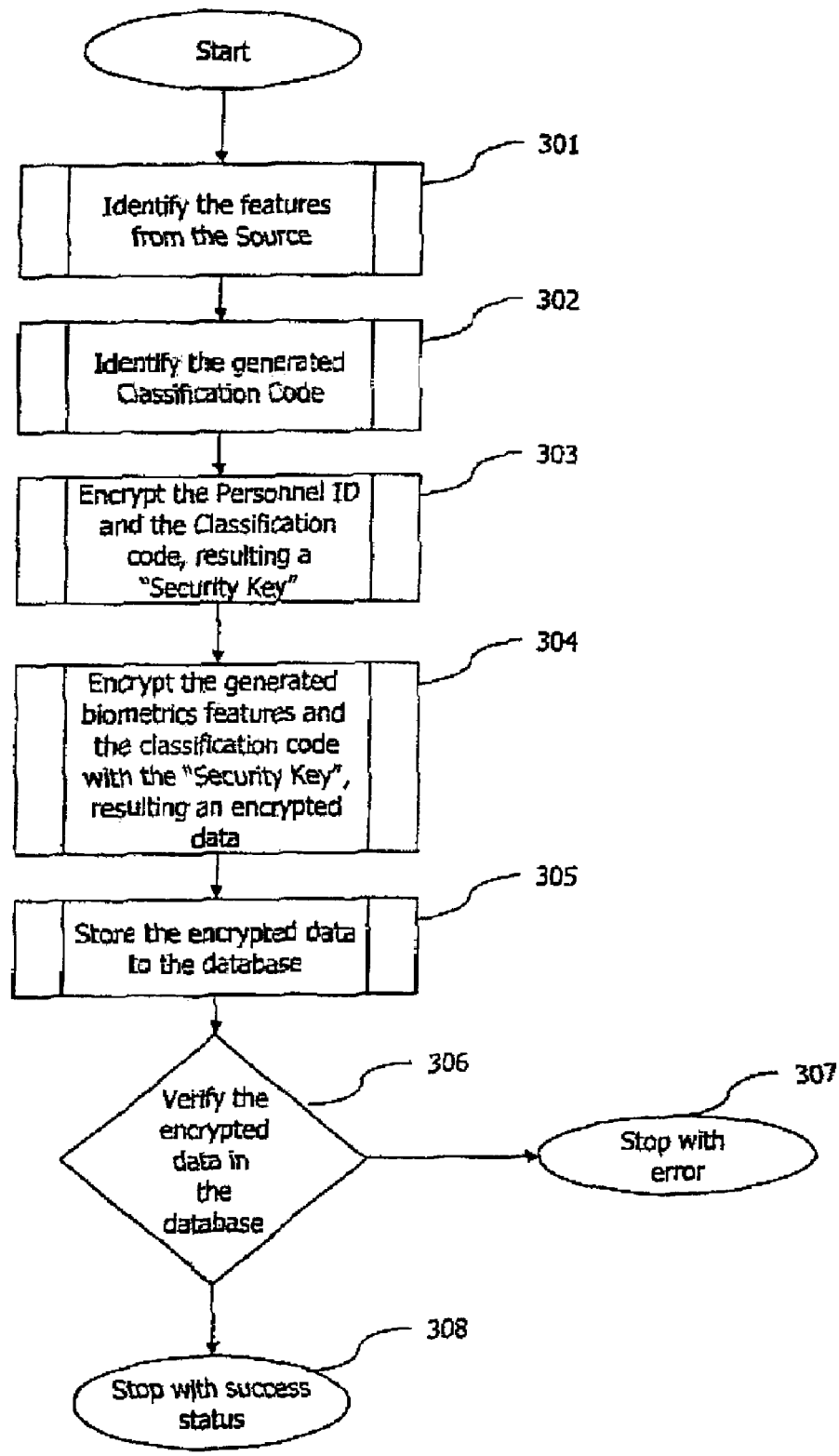
FIG. 3 is a flow diagram of the process of storing the biometrics features in the database.

FIG. 3 is a flow diagram of the process of storing the biometrics features in the database. In this process the biometrics information including but not limited to biometrics features and classification code are stored in the database in a secure method.

This process ensures the integrity of the information within the biometrics database. The method prevents identity thefts, replacements that can occur within the database.

The process starts with identification of the features from the "raw data" in the step 301. In the step 302, the classification code is generated for the "raw data". The data from the 301 and the 302 can also be the inputs from the other processes.

In the step 303, the personnel identifier (unique identifier for the personnel) is encrypted with the classification code (from the step 302) and as a result a "Security Key" is generated. The encryption is carried out using the personnel identifier as a key. The cipher strength of the encryption is automatically selected based on the computing power of the environment.

In the step 304, the biometrics features from the step 301 and the classification code from the step 302 are encrypted using the "Security Key" from the step 303, resulting a "encrypted data". The encryption at this is similar to the step 303 with regards to the type and the cipher strength.

After the encryption, the process continues to step 305, where the "encrypted data" is stored in database along the Personnel ID and the Classification Code embedded in the Personnel ID. The classification code is actually added to the suffix of the personnel ID.

The stored encrypted information is verified at the step 306 and if the verification fails the process terminates with the failure state in the step 307.

When the verification at the step 306 succeeds, the process stops with the success state in the step 308.

Figure 4:
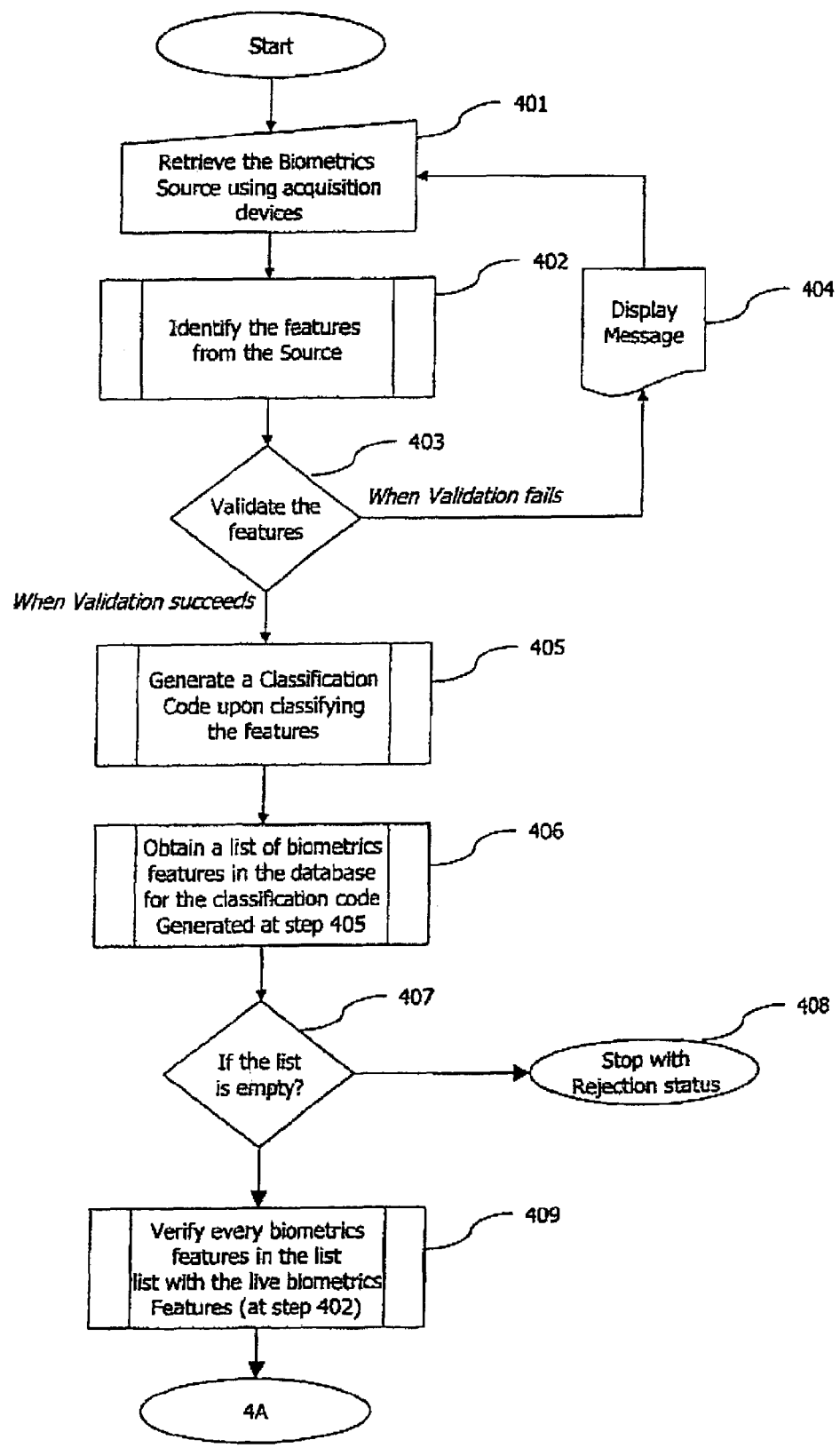
FIG. 4 is a flow diagram of the process of identifying the personnel with live biometrics features from the database of biometrics features.

FIG. 4 is a flow diagram of the process of identifying the personnel with live biometrics features from the database of biometrics features.

This process identifies the personnel using his/her biometrics features from the database. The database actually contains the biometrics features with the classification code in an encrypted form. Upon successful match of the biometric features, the unique identifier for the personnel is actually used for personnel identification.

The process starts with the retrieval of the biometrics source (raw data) in the step 401. As in the previous processes the features are identified from the raw data in the step 402. The identified features are also validated in the step 403 and the process restarts from the step 401 after notifying the user (in the step 404) when the validation fails.

The process continues from the step 405 when the validation succeeds at step 403. In the step 405, the classification code is generated for the biometrics features extracted at 402.

With the classification code from the step 405, a list of biometrics features is generated from the database in the step 406. In the step 407, it is checked for the generated list is empty and when the list is empty the process terminates with the reject status (in step 408).

The process continues from the step 409, where every biometrics features in the list generated at step 406 is verified with the biometrics features from the step 402. If match was not found (as checked in the step 410), the process terminates with the reject status (in step 411).

If a match was found, in the step 412 the individual is identified with the unique identifier tagged with the match biometrics features and the process terminates with the success state.

Figure 5:
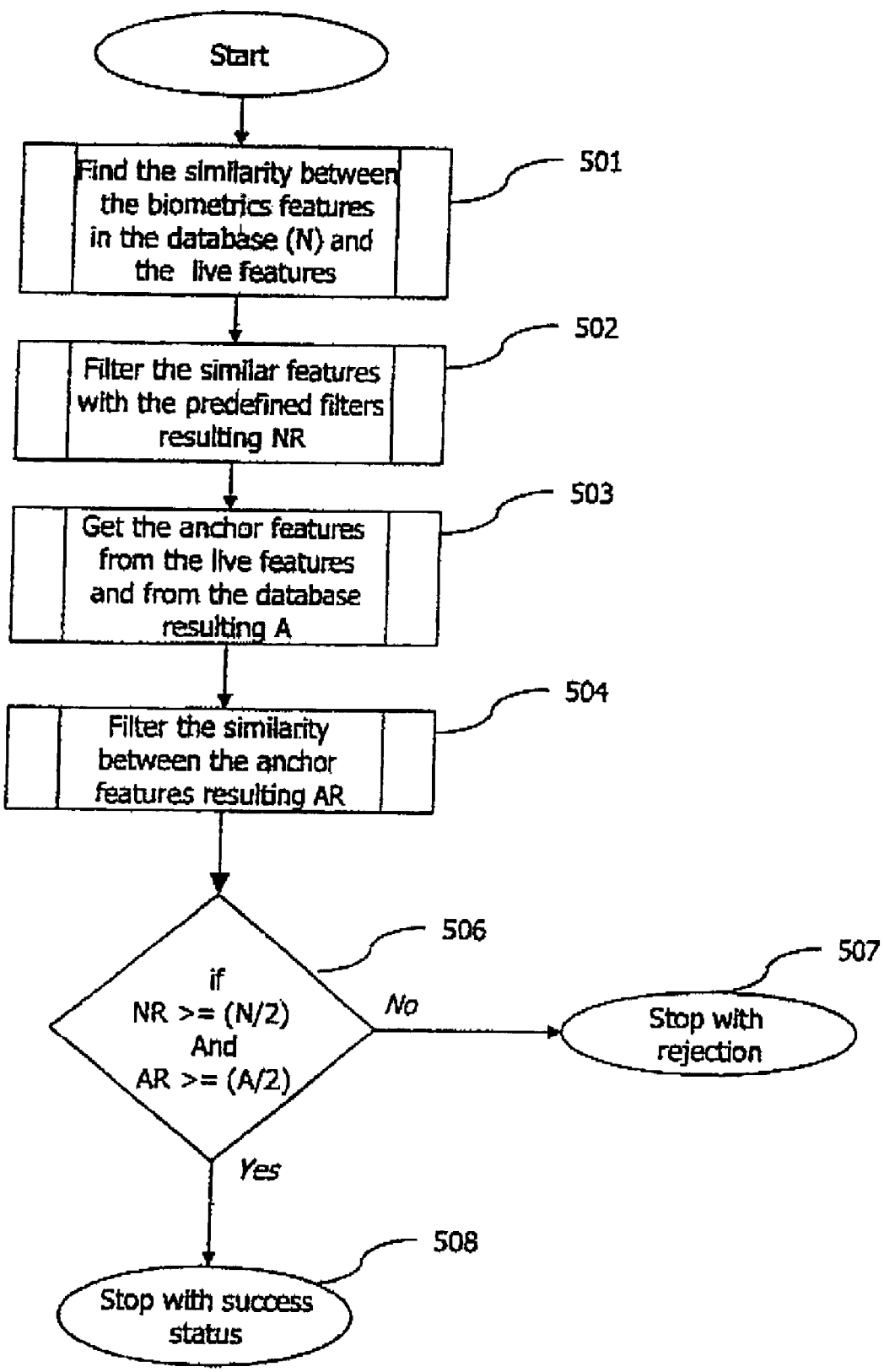
FIG. 5 is a flow diagram of the process of individual verification of biometrics features with the live biometrics features.
Figure 6:
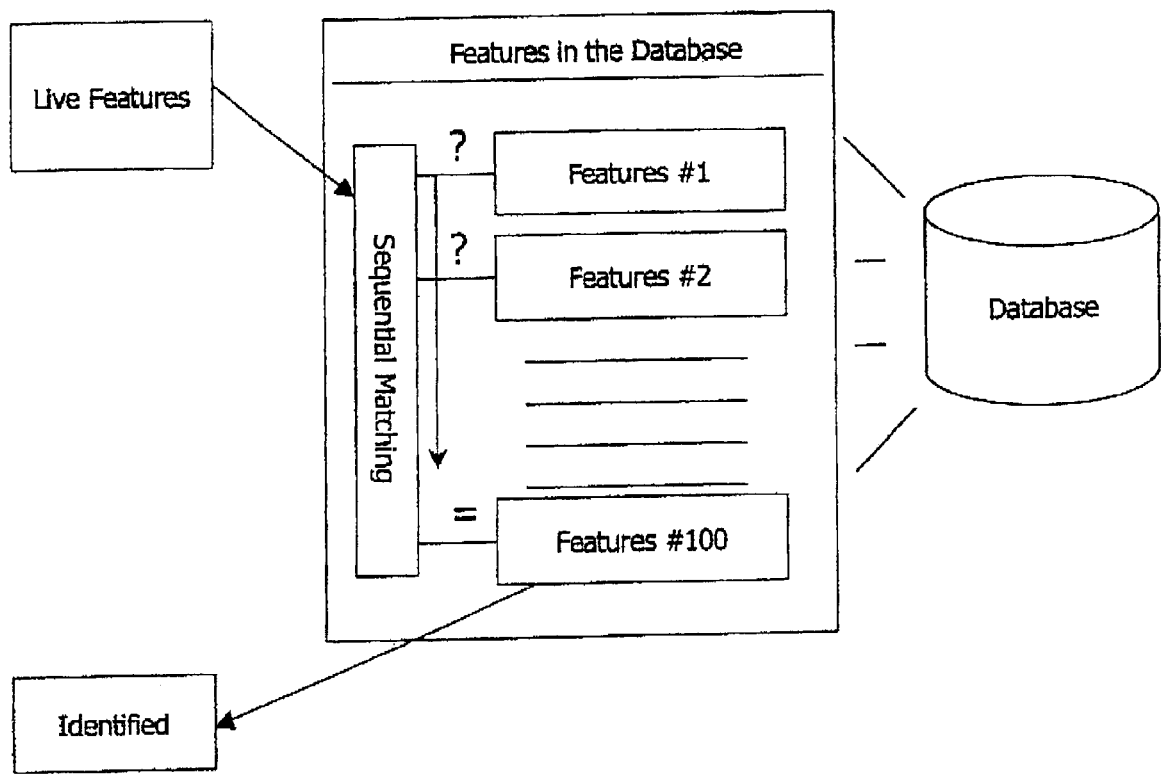
FIG. 6 shows a segmental verification of the biometrics data with full comparison.
Figure 7:
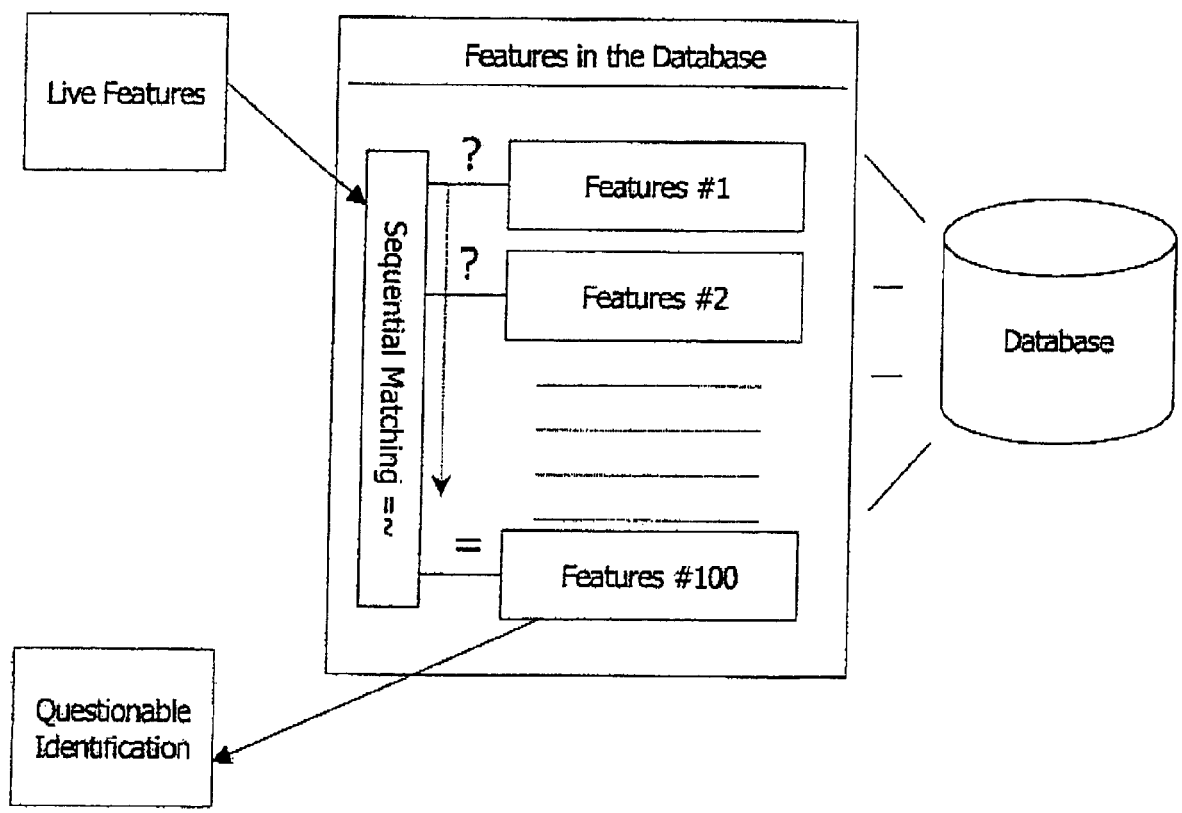
FIG. 7 shows a segmental verification of the biometrics data with partial comparison.
Figure 8:
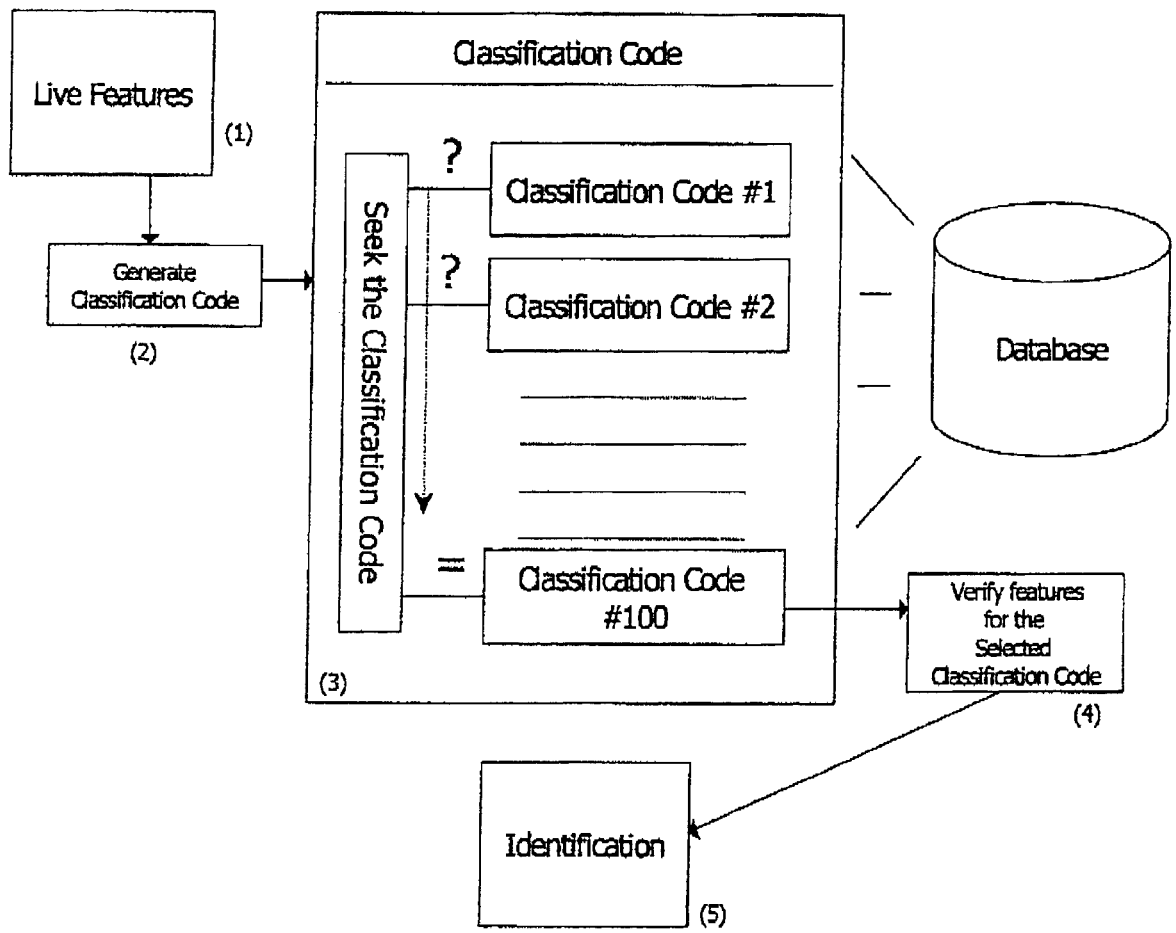
FIG. 8 shows a process diagram of identification of an individual using biometrics data and classification code.

FIG. 5 is a flow diagram of the process of individual verification of biometrics features with the live biometrics features.

This process verifies the biometrics features stored in the database with the live biometrics features generated from the obtained raw data. This process actually matches the features and plays an important role in the biometrics identification.

The process requires the biometrics features of the live raw data as the input and starts from the step 501.

In the step 501, the list of similar features between the biometrics features in the database and the live biometrics features is generated. The similar features are identified by the properties such as placement and direction with a threshold value based on the type of biometrics. The threshold value actually eliminates the false similar features.

The similar features from the step 501 are actually filtered with the predefined criterion in the step 502. The predefined criterions are obtained during test runs of the verification process and varies based on the type of biometrics. The test runs are manual process of the verification of the biometrics features In the step 502, the false similar features and also least similar features are eliminated. This step actually reduces the false rejection rate (FRR) and false acceptance rate (FAR).

The process continues from the step 503, when the anchor features are obtained from the biometrics features in the database and also the biometrics features of the raw data. The similar anchor features are also identified in this step and in the step 504, the similar anchor features are filtered with predefined criterions obtained from the manual biometrics verification.

In the step 506, the probability of the match is found by checking the number of similar features and similar anchor features with the number of features in the databases' biometrics data and the number of anchor features respectively. If the number of similar features is above the half of its numbers, it is assumed that a match is found and the process stops with the success state (in the step 508) else the process terminates with the rejection as in the step 507.

The invention claimed is:

1. A method of identifying an individual using biometric data comprising the steps of
   (i) enrolling biometric data of the individual, wherein said biometric data includes data obtained from more than one biometric data of the same individual, and wherein said biometric data is selected from one or more of the following: finger print, palm print, iris or any other biometric data;
   (ii) identifying anchor features and all other identifiable significant features, wherein the anchor features consist of:
      (a) center point in finger prints or palm prints;
      (b) optic discs in retina image; or
      (c) lens section in iris image;
   wherein the significant features consist of:
      (a) ridge join points, ridge line endings for finger prints or palm prints; or
      (b) macula and vessel density in retina, and lens and iris portion in iris image;
   (iii) computing relativity in position of each significant feature in relation to the other feature, wherein the relativity includes distance or direction or both, and wherein the distance is expressed in number of ridges between the anchor feature and the significant feature;
   (iv) combining the relativity as computed in the step (iii) to obtain a classification code;
   (v) encrypting the classification code obtained in the step (iv) and the biometric data obtained in the step (i);
   (vi) storing the encrypted data obtained in the step (v);
   (vii) repeating the steps (i), (ii), (iii), (iv), (v) and (vi) for a biometric data of a person to be identified, wherein in the step (i) enrolling is replaced with capturing; and
   (viii) matching the classification code obtained in the step (vii) against the classification code obtained in the step (iv), wherein the matching step includes checking an absolute equality of the classification code.

2. The method of claim 1, further comprising:
   (ix) verifying the biometric data obtained in the step (vii) against the biometric data obtained in the step (i).

3. The method of claim 2, wherein the method further includes identifying the individual using a personal identification number.

4. The method of claim 1, wherein the method further includes identifying the individual using a personal identification number.

5. A system of biometric verification of an individual incorporating the method as claimed in one of claims 1, 2, 4 and 3.

6. An electronic system requiring identification of an individual which includes a method as claimed in one of claims 1, 2, 4 and 3.

* * * * *